United States Patent [19]

Bachmann

[11] Patent Number: 4,800,919

[45] Date of Patent: Jan. 31, 1989

[54] FLAP GATE ASSEMBLY

[76] Inventor: Lothar Bachmann, Dillingham Hill Rd., R.F.D #3, Auburn, Me. 04210

[21] Appl. No.: 63,414

[22] Filed: Jun. 18, 1987

[51] Int. Cl.⁴ .............................................. F16K 15/03
[52] U.S. Cl. ............................... 137/527.4; 137/527.6; 137/527.8; 251/87; 251/356
[58] Field of Search ................... 137/527, 527.4, 527.6, 137/527.8, 572; 251/356, 87, 298, 299, 366

[56] References Cited

U.S. PATENT DOCUMENTS

| | | | |
|---|---|---|---|
| 1,334,354 | 3/1920 | Dodd | 251/356 |
| 1,670,520 | 5/1928 | Pekrul | 137/527.6 |
| 1,744,798 | 1/1930 | Price | 137/527 |
| 1,837,658 | 12/1931 | Force et al. | 137/527.6 |
| 2,082,543 | 6/1937 | Hillman | 137/527.8 |
| 2,176,522 | 10/1939 | Brown | 137/527.6 |
| 2,176,523 | 10/1939 | Brown | 137/527.6 |
| 2,328,419 | 8/1943 | Brown | 137/527.6 |
| 2,603,451 | 7/1952 | Brown | 251/356 |
| 4,492,361 | 1/1985 | Jacquet et al. | 251/356 |
| 4,512,356 | 4/1985 | Widerby | 251/298 X |

Primary Examiner—John Rivell

[57] ABSTRACT

A flap gate installation for systems where liquids are pumped into a holding tank has a fabricated frame surrounding the port of the conduit which opens into the tank. A flap gate is hingedly connected to the top of the frame and has concavo-convex walls welded to a gate frame with the convex surfaces of the walls the outer surface of the gate. The flap gate is held seated and sealed against the installed frame not only by its weight but by the head on stored liquids and is opened against that head by pumping pressures on liquid to be delivered into the holding tank. the cancavo-convex walls of the gate enable the weight of the gate to be substantially reduced with a corresponding reduction in pumping costs.

7 Claims, 3 Drawing Sheets

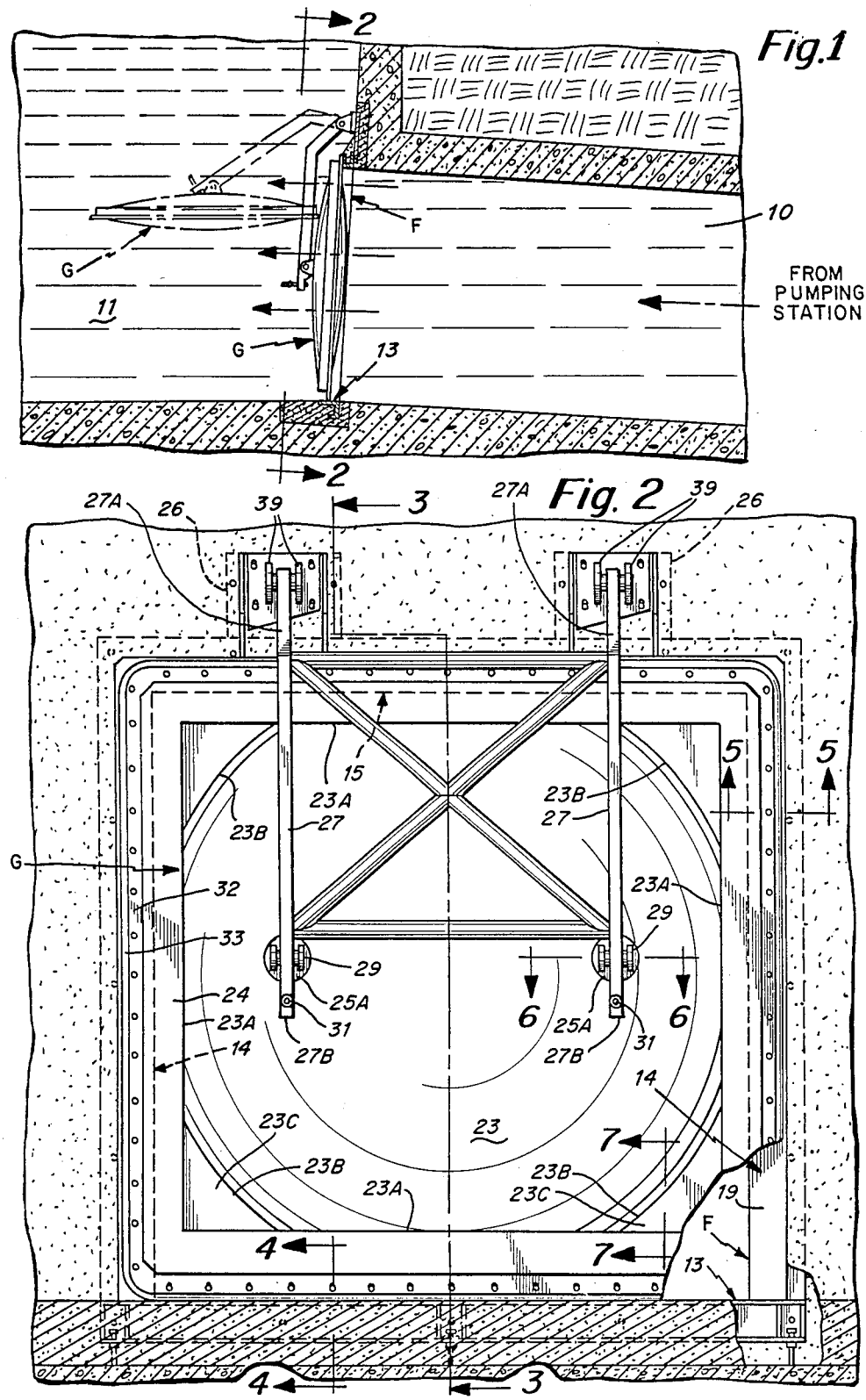

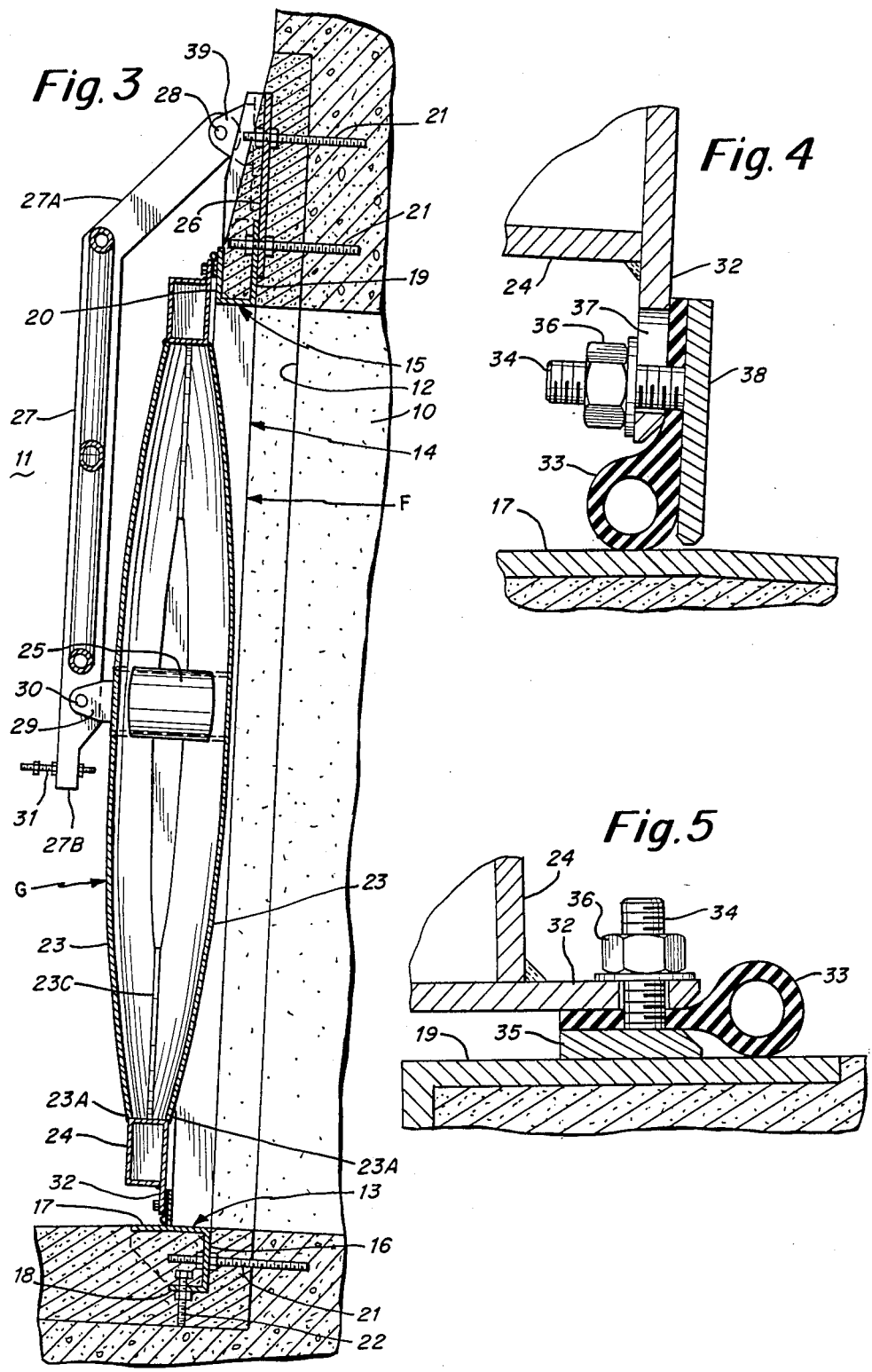

FLAP GATE ASSEMBLY

BACKGROUND OF THE INVENTION

In some water treatment systems, it is necessary to pump water against a head, into a holding tank or upgrade, for examples. Flap gates are used in such systems as they are held closed by the head and can be opened by an adequate pumping pressure on water to be passed therethrough.

Such gates are large and their weight is an important factor in the cost of such an installation as the heavier the gate, the greater is its cost and also the higher are pumping costs. As far as I am aware, such flap gates as are used for the above or like purposes have flat, internally braced walls resulting in constructions which, while capable of withstanding both head and pumping pressures, are disproportionate in both weight and cost.

THE PRESENT INVENTION

The general objective of the present invention is to provide flap gate assemblies the gates of which are substantially lighter in weight than the gates presently in use and thus enable their cost as well as pumping costs to be reduced.

This objective is attained by utilizing concavo-convex walls disposed with their convex surfaces outermost and with margins of the walls welded to a gate frame. Such walls are sheet metal stampings and the concavo-convex formation may be circular when the gate is to be square or oval if the gate is to be oblong. Such walls have straight top, bottom and side margins which, in effect trim their concavo-convex formation leaving intermediate arcuate portions. The straight margins of the two walls are welded directly to the gate frame in a spaced apart relationship such that there is a space between corresponding arcuate portions the edges of which are welded to corner establishing plates which are welded to the frame to complete the walls. Such plates may or may not be spaced apart or the wall assembly may be such that corresponding arcuate portions can be both welded to the same corner establishing plate.

In practice, the depth of the central area of a wall concavity relative to a plane inclusive of the arcuate wall portion of a radius which is approximately twice the distance between diagonally opposite arcuate portions although curvatures may not conform to that radius.

Another aspect of the invention is the rectangular frame to which the walls of the gate are welded. In accordance with the invention, the frame is hollow and has a marginal exposed flange.

Another important feature of the invention is the rectangular supporting frame for the flap gate. The supporting frame has a first section including top and side portions which are U-shaped in cross section with their inner walls coplanar and anchored to wall structure surrounding the entrance into the tank. The outer walls are shorter and establish planar surfaces which are engageable by seals carried by corresponding portions of the flange of the flap gate frame. The supporting frame also includes a bottom portion which is U-shaped in cross section and anchored to the wall structure with one wall normal thereto and positioned to be engaged by a seal exposed along the bottom edge of the bottom portion of the flap gate frame.

Another object of the invention is to provide for the connection of the flap gate to the supporting frame in a suitable manner. To that end, the top portion of the supporting frame has supports to which the upper ends of supporting arms are pivotally connected. Adjacent their other ends, the arms are connected to yokes fixed on reinforcements extending through and welded to the walls of the gate close to their transverse center lines.

Another objective of the invention is to ensure that once the gate is opened, it will offer minimum resistance to the flow of pumped water into the tank. To that end, the connection between the lower ends of the supporting arms and the gate permit limited pivoting of the gate relative to the arms in a manner such that when the gate is opened it is so positioned in the path of the water being pumped into the tank as to offer minimum resistance to water flowing over and under it.

Other objectives of the invention, the manner of their attainment will be apparent from the following description of a preferred embodiment.

BRIEF DESCRIPTION OF THE DRAWINGS

The accompanying drawings illustrate a preferred embodiment of the invention of which FIG. 1 is a view showing a flap gate assembly in accordance with the invention installed at the entrance of a holding tank;

FIG. 2 is a view taken approximately along the indicated line 2—2 of FIG. 1;

FIG. 3 is a section taken along the indicated line 3—3 of FIG. 2;

FIG. 4 is a section, on an increase in scale, taken approximately along the indicated line 4—4 of FIG. 2;

FIG. 5 is a like section taken approximately along the indicated line 5—5 of FIG. 2;

THE PREFERRED EMBODIMENT OF THE INVENTION

Figure 6:
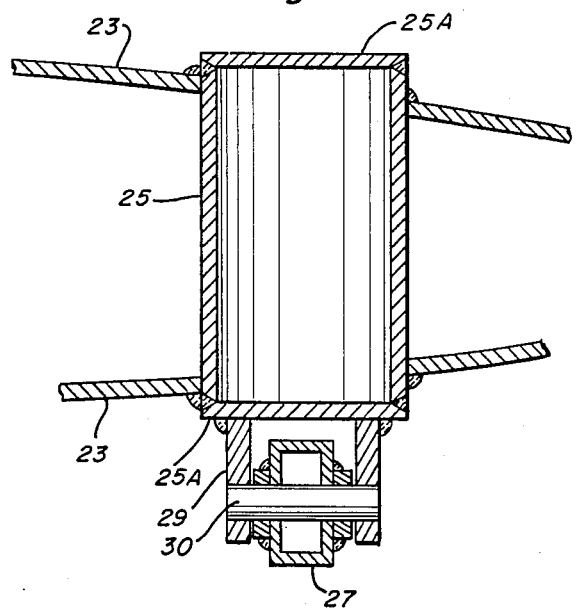
FIG. 6 is another like section taken along the indicated line 6—6 of FIG. 2.
Figure 7:
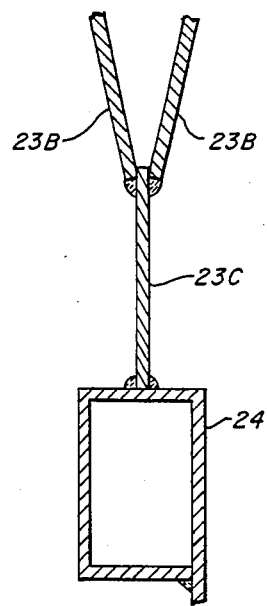
FIG. 7 is yet another similar section taken along the indicated line 7—7 of FIG. 2.

In accordance with the invention, the port of the conduit 10 opening upgrade into a holding tank 11 is surrounded by a square recess 12 to the inner wall of which the supporting frame, generally indicated at F, for the flap gate, generally indicated at G is anchored.

The supporting frame F has a bottom portion, generally indicated at 13 and side and top portions, generally indicated at 14 and 15, respectively. The bottom portion 13 is U-shaped in cross section and is disposed with its closed end wall 16 facing the inner wall of the recess 12 and has its upper wall 17 longer than its lower wall 18. The side and top portions are also U-shaped in cross section but are disposed with their inner walls 19, which are longer than the outer walls 20, in a plane, when the gate supporting frame is installed, inclusive of the end wall 16 of the bottom portion 13 and normal to the conduit 10.

The gate-supporting frame F is shown secured to the inner wall of the recess 12 by adjustable anchors 21 extending through the walls 16 and 19 into the inner wall of the recess 12 and having adjusting nuts threaded on their opposite sides enabling them to be positioned in the above referred-to plane. The lower wall 18 is provided with similar supports 22 for use in levelling the frame portion 13.

The flap gate G is shown as square and has a pair of concavo-convex walls 23 disposed with their convex surfaces of the outer faces of the gate. The walls have straight top, bottom and sides 23A and intermediate arcuate portions 23B. The radius of the concave surfaces of the walls 23 is typically in the order of twice their diameter. The sides 23A are welded to a square gate frame 24 in a spaced apart relationship such that, in the disclosed embodiment, corresponding ones of the arcuate portions 23B of the two walls can be and are welded to a common plate section 23C shaped and dimensioned to establish square corners marginally welded to the frame 24 to complete the walls.

Close to but above the transverse center line of the gate G, see FIG. 6, the two walls have transversely spaced tubular reinforcements or braces 25 opening through the walls 23 and welded thereto as are their end plates 25A.

The top portion 15 of the gate supporting frame F is provided with a pair of transversely spaced gate supports 26 equally spaced from the side of the frame F proximate thereto. The supports 26 are shown as connected to the top portion 15 by means of the appropriate ones of the frame anchors 21 and are also directly secured to the inner wall of the recess 12 by additional anchors 21. Each support 26 has a pair of ears 39 which receive between them the upper angularly disposed end 27A of the appropriate one of the cross braced arms 27 which is connected thereto by a pivot pin 28. Each arm 27, adjacent its lower end 27B fits within a yoke 29 welded to the appropriate one of the end plates 25A and is connected thereto by a pivot 30. The arm ends 27B are of reduced thickness on their sides proximate to the gate G and are provided with adjustable stops 31 to limit the extent to which the gate can pivot toward the arm ends 27B.

When the frame F has been installed, the recess 12 is filled with grouting which also fills the U-shaped frame portions 13, 14 and 15 and the space underlying the frame portion 13.

The gate frame 24 is hollow and rectangular in cross section and has its wall that is proximate to the inner wall of the recess 12 dimensioned to provide a planar flange 32 exposed marginally of the gate frame 24.

Along the sides and top of the flange 32, a seal 33 is secured as by bolts 34 spaced along and fixed to a seal clamp 35. The bolts 34 extend through the flange 32 and are anchored by nuts 36. Along the bottom of the gate frame 24, the flange 32 is provided with vertical slots 37 spaced therealong through which bolts 34 extend which are spaced appropriately along the seal clamp 38 to be locked by nuts 36 when the seal 33 is positioned to engage the upper wall 16 of the bottom portion 13 of the gate supporting frame F.

It will be apparent that the flap gate G when closed, is marginally sealed against its supporting frame F not only by its own weight but also by the head on the tank contents exerted against it. The gate G can be swung into an open position only when the pumping pressure on liquid in the conduit 10 exceeds the existing head.

In a flap gate installation in accordance with the invention, when water is to be discharged against an existing head, a conventional pump is employed capable of producing pumping pressure adequate for that purpose. In the disclosed embodiment, the stops 31 are adjusted so that the fully open position of the gate G results when the gate G reaches that position in which t is seated against the stop and permits flow of pumped water over and under it with minimum resistance to the tank entering stream, the broken line position of the gate G in FIG. 1. In such an open position, the gate G is close to the upper limit of that stream with that portion of the arms 27 then overlying the gate G defining an acute angle, typically about 20°, with respect to a horizontal plane inclusive of the pivots 28.

I claim:

1. A flap gate assembly for use in establishing a first, water receiving section in which water therein is under a head and a second, pump controlled water delivery section in communication therewith, said assembly including a gate supporting frame to be installed at the wanted junction of said sections transversely thereof, a flap gate on the head side of the frame and including a gate frame and first and second walls which are sheet metal stampings strengthened by being so deformed that one surface is dished and the other surface correspondingly protrudes, said walls having their dished surfaces proximate and said walls marginally sealed to the gate frame, a seal carried by one of said frames for sealing engagement with the other of said frames when the flap gate is closed, and supporting structure pivotally connected to a side of the supporting frame and to the side of the flap gate exposed in said first section and close to a center line of the flap gate parallel to said side of the supporting frame but between said line and said last named side, said structure shaped and dimensioned to enable the gate to be swung relative to the gate supporting frame by an incoming stream of adequate pressure into an unseated position and also to swing relative to the supporting structure into an open position with both surfaces exposed in said first section in said stream with the gate frame in a plane parallel to the flow path.

2. The flap gate assembly of claim 1 in which the supporting structure include laterally spaced supporting arms pivotally connected at one of their ends to the gate supporting frame, brace means, one for each supporting arm and between the walls of the flap gate and extending therethrough and welded thereto, pivot means connecting a lower end portion of each of said arms to the appropriate one of the brace means on the upstream side of the gate.

3. The flap gate assembly of claim 1 in which the frames are rectangular, the walls have straight, top, bottom and side margins which, in effect, trim the deformations and the walls are welded to the gate frame in a spaced apart relationship.

4. The flap gate assembly of claim 3 in which the deformation of the wall is curvilinear and the proximate side margins are separated by curved portions which are spaced apart, and plates are welded to the curved portions and to the gate frame, said plates shaped and dimensioned to form wall completing corners thereof.

5. The flap gate assembly of claim 4 in which there is a separate plate for each corner of the gate walls and each plate is common to the two walls.

6. The flap gate of claim 1 in which a major portion of each wall is concavo-convex and a maximum depth of each wall relative to a plane inclusive of the maximum diameter of said portion is equal to that portion of the radius of the concave surface which radius is approximately twice said diameter.

7. The flap gate assembly of claim 1 in which the gate frame is rectangular in cross section the wall of which on the side of the gate exposed in said first section extending outwardly from the top, bottom and sides and including a seal, the supporting frame includes top, bottom and side portions which are U-shaped in cross section and have one wall wider than the other, the top and side portions disposed with their shorter walls in said first section for engagement by appropriate portions of the seal and said bottom portion positioned with its closed end coplanar with respect to the wider walls of the other portions and engageable by the appropriate portion of said seal.

* * * * *